July 9, 1957  C. N. EHRLICH  2,798,686
SHOCK-PROOF INSTRUMENT MOUNTING
Filed June 2, 1952  2 Sheets-Sheet 1
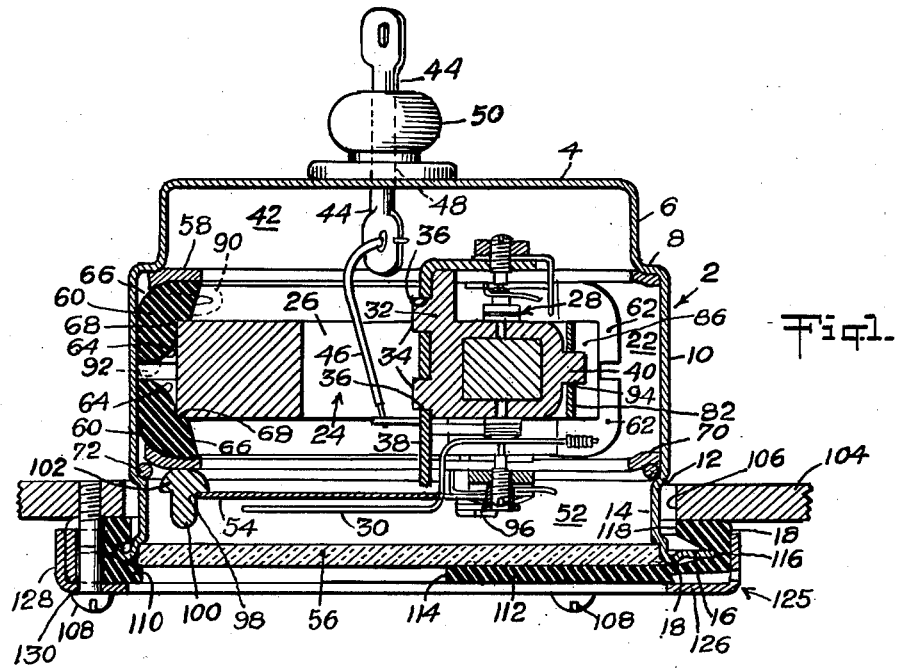
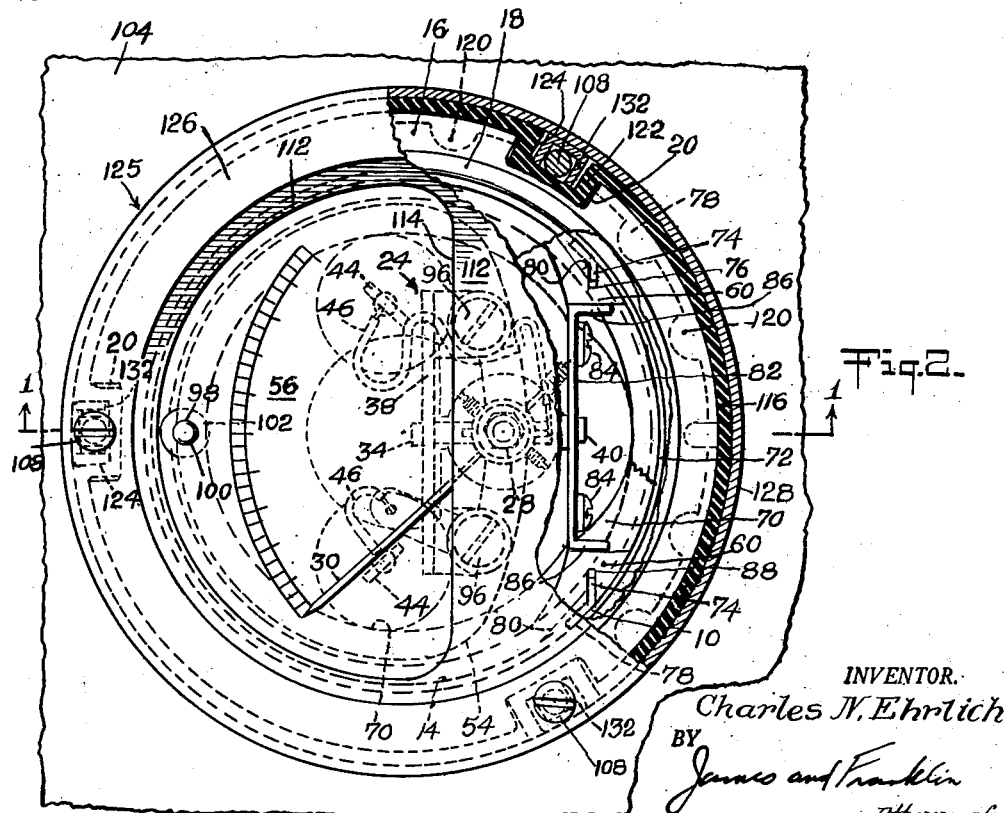
INVENTOR.
Charles N. Ehrlich
BY
James and Franklin
Attorneys.

July 9, 1957 C. N. EHRLICH 2,798,686
SHOCK-PROOF INSTRUMENT MOUNTING
Filed June 2, 1952 2 Sheets-Sheet 2
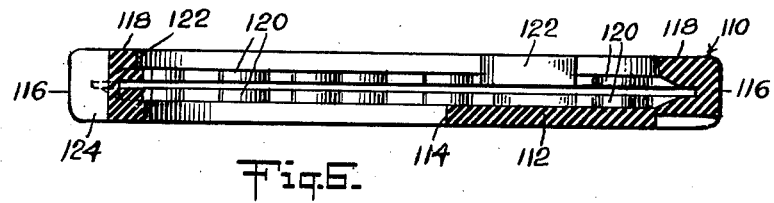
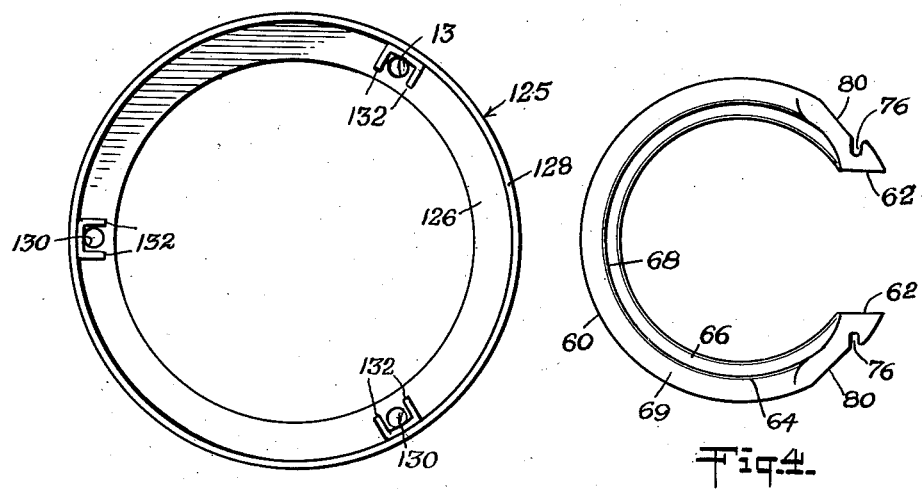
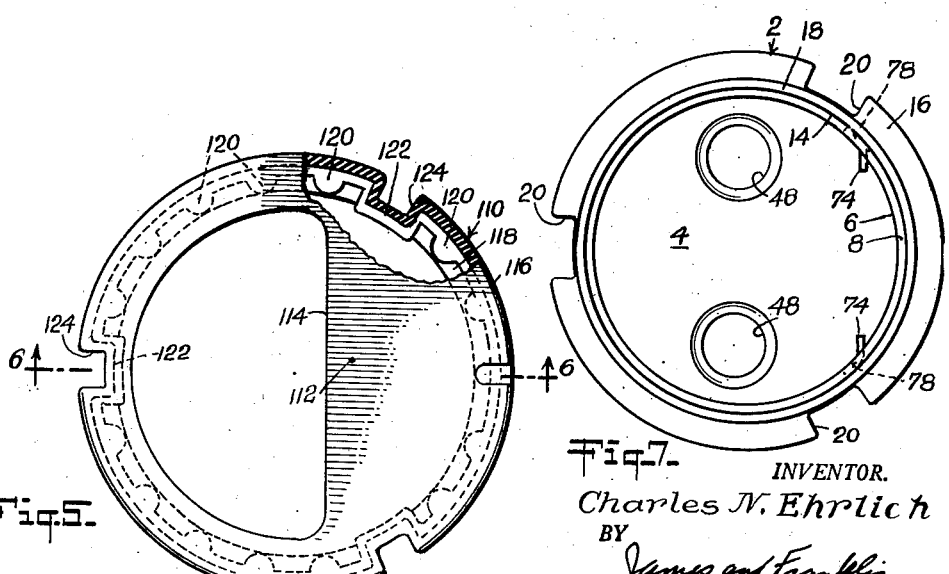
INVENTOR.
Charles N. Ehrlich
BY
James and Franklin
Attorneys United States Patent Office 2,798,686
Patented July 9, 1957

2,798,686

SHOCK-PROOF INSTRUMENT MOUNTING

Charles N. Ehrlich, New York, N. Y., assignor to De Jur-Amsco Corporation, Long Island City, N. Y., a corporation of New York Application June 2, 1952, Serial No. 291,180

12 Claims. (Cl. 248—358)

The present invention relates to a mounting means for a sensitive instrument mounted within a casing, by means of which said instrument is substantially protected from the effects of vibration or shock imparted to the casing or to the structure upon which the casing is mounted.

Many indicating instruments must be used in installations where they will be subjected to severe impact, shock and vibration conditions. Unless the instruments in question are suitably mounted so as to be insulated from the effects of those conditions, they will rapidly become inaccurate if not completely inoperative. Many types of shock- and/or vibration-proof instrument mountings have been devised in the past, and some of them are fairly effective as against shock or vibration in certain directions, but not in all directions. In particular, while the instrument is often supported so as to fairly well resist shock or vibration in longitudinal, vertical or lateral directions, the instrument is not as well insulated from vibration or impact in a torsional or twisting direction.

In order to prevent the instrument from rotating with respect to its mounting and at the same time mount the instrument so as to be insulated against impact and vibration in all directions, the instrument is mounted on and between a pair of resilient members, those members in turn being supported by the casing, the instrument being out of engagement with the casing and supported thereby only through said resilient members. At least one of the resilient members extends only part way around the interior of the casing and terminates in opposed ends. A bracket is secured to the instrument and received snugly between the opposed ends of the resilient member. Hence rotation of the instrument with respect to the resilient member is positively prevented, and any forces tending to cause such rotation will be taken up and absorbed by the resiliency of the member itself. The resilient member may be held against rotation within the casing largely through its frictional engagement with the casing wall, pressure preferably being applied to the resilient member so as to force it into said frictional engagement with the casing wall. However, where this engagement is not sufficient, and when particularly severe impact stresses are expected, rotation of the resilient member within the casing may be more positively prevented by providing said member with recesses into which projections are received, said projections being fixedly secured to the casing.

The resilient members themselves are of a special design particularly adapted for the protection of the instrument when subjected to impacts of large magnitudes. The instrument is adapted to seat on a ledge defined by two meeting curved surfaces. Thus a substantial body of resilient material is interposed between the instrument and the casing no matter in what direction the instrument may be moved. Because of the curved nature of the surfaces in question, if the instrument should move toward one of those surfaces, impelled in that direction by shock or impact, the resilient member will readily bell or bulge out so as to interpose itself to an even greater degree between the instrument and the casing in the direction in which the instrument is urged, thus providing a positively acting cushion of great extent between the instrument and the casing portion toward which it is forced.

In many instances, and particularly in the case of electrical instruments of the moving coil type, certain portions of the instrument are movable or adjustable with respect to other portions thereof, and must be clamped in adjusted position if the accuracy of the instrument is to be unimpaired. According to the present invention such relatively movable instrument portions are held in position by engagement with the same structural elements which resiliently retain the instrument in fixed rotative position with respect to its mounting, thus providing a real degree of protection from shock to those instrument portions.

In order to even further protect the casing-contained instrument from external forces, the casing is mounted on a panel board or the like in such a manner as to be completely shock-insulated therefrom. A major problem involved in this type of mounting is presented by the screws or other securing devices which must be used to hold the casing in place on the panel board. According to the present invention these screws are not only shock-insulated from the casing itself, but also prevent rotation of the casing with respect to the panel board on which it is mounted without detracting from the shock- and vibration-insulation of the casing.

All of the above results are accomplished by a structure which employs a minimum number of easily assembled parts, each of the parts being readily fabricatable on a mass production basis. The structure is particularly well adapted for use in conjunction with a hermetically sealed casing, and it is so here illustrated, but it could, of course, be employed in conjunction with other casings as well.

To the accomplishment of the above, and to such other objects as may hereinafter appear, the present invention relates to a shock-proof instrument mounting structure as defined in the appended claims and as described in this specification taken together with the accompanying drawings in which:

Fig. 1 is a cross sectional view, taken along the line 1—1 of Fig. 2, showing the mounting structure of the present invention, the casing being shown in inverted position;

Fig. 2 is a top plan view, partially broken away, of the mounting structure of Fig. 1;

Fig. 3 is a bottom plan view of the mounting ring employed for mounting the casing on a panel board;

Fig. 4 is a top plan view of one of the resilient members employed for mounting the instrument within the casing;

Fig. 5 is a top plan view, partially broken away, of the shock absorbing ring utilized in mounting the casing on the panel board;

Fig. 6 is a cross sectional view thereof taken along the line 6—6 of Fig. 5; and Fig. 7 is a top plan view of the empty casing.

The casing, generally designated 2, is defined by a bottom wall 4 and a side wall consisting of a short lower section 6, an outwardly flared portion 8, a longer vertical portion 10, an inwardly flared portion 12, a short vertical portion 14, and a laterally extending rim 16 having a bead 18 formed thereabout and having a plurality of peripheral notches 20 formed therein. The space laterally between the side wall section 10 and vertically between the side wall sections 8 and 12 constitutes the instrument-receiving portion of the casing, and is generally designated 22, Fig. 1 making it clear that the radial dimension of the instrument-receiving portion 22 is somewhat larger than the radial dimensions of the casing portions above and below it. An instrument, generally designated 24, is adapted to be mounted in the instrument-receiving casing portion 22, that instrument being here disclosed in the form of a moving coil galvanometer or the like and consisting of a fixed magnetic or electromagnetic section 26, a movable indicating portion generally designated 28 and operatively connected to a pointer 30, and a mounting section generally designated 32 for the indicating section 28, said mounting section 32 being provided at one end with projections 34 received within apertures 36 in fixed plate 38 which forms a part of the instrument, and provided at its other end with a projection or finger 40 for a purpose hereinafter to be described.

The casing portion 42 laterally between the side wall 6 and directly above the lower wall 4 is adapted to receive a pair of terminal lugs 44 which are connected, by means of wires 46, to appropriate portions of the instrument 24, the connecting lugs 44 passing through apertures 48 formed in the bottom wall 4 and being sealed in place and insulated from the casing 2 by means of structure generally designated 50. The casing portion 52 laterally between the side wall portions 14 is adapted to receive the pointer 30 which is movable over a suitably graduated scale plate 54. A crystal 56 of glass or other transparent material is received and sealed inside of the bead 18 formed on the casing rim 16.

In mounting the instrument within the casing, a retaining ring 58 is first dropped into place so as to rest on the ledge formed by the side wall section 8. A resilient member 60 is then placed in position thereover. This member is formed of rubber or other resilient or shock absorbing material and is in arcuate form the maximum external diameter of which is substantially the same as the internal diameter of the instrument-receiving casing portion 22. The resilient member 60 has an arcuate length such as to extend around at least a major portion of the inner periphery of the casing portion 22, and in order to mount the instrument 24 so as to resist torsional shock or vibration, it preferably does not extend all the way around that periphery, but terminates in opposed and spaced ends 62. The inner surface of the resilient member 60 is composed of a pair of curved surfaces 64 and 66 meeting along a line 68 intermediate between the upper and lower sides of the resilient member 60 and defining a ledge. The curved surfaces 64 and 66 are so designed that the lower portion of the curved surface 64 of the upper resilient member 60 of Fig. 1 (and the upper portion of the curved surface 64 of the lower resilient member 60 of Fig. 1) will define an enlarged opening in the direction of the other curved surface 66 upon which the instrument 24 is vertically seated, the surfaces 66 themselves serving as lateral seats for the instrument 24. It is not essential that the surfaces 64 and 66 be curved throughout their length, but it is desired that they be curved over a substantial portion of their length and that they incline with respect with one another so as to define the aforementioned ledge 68 upon which the instrument 24 will seat. For example, in one specific embodiment in which a resilient member 60 having a diameter of 2 1/16 inches is employed, the surface 64 is smoothly curved with a radius of 5/32 of an inch, while the surface 66 is defined by a curved portion having a radius of 1/16 of an inch extending from the line 68 and merging into a straight surface inclined outwardly fifteen degrees with respect to the axis of the member 60.

The instrument 24 is mounted between oppositely oriented resilient members 60 so that the outer edges of the instrument seat on the ledges 68. A second retaining ring 70 is placed on top of the upper resilient member 60, the height of the instrument-casing portion 22 being so related to the combined heights of the retaining rings 58 and 70 and the resilient member 60 when the instrument 24 is mounted therebetween, that when a split ring 72 is interposed between the upper retaining ring 70 and the casing wall section 12 the resilient member 60 will be axially compressed, thus firmly grasping and mounting the instrument 24, the compression of the resilient members 60 causing their outer surfaces to be pressed against the casing wall 10 with a substantial amount of force, thus restricting any tendency which the resilient member 60 might otherwise have to rotate axially within the casing 2. In order to positively prevent any such tendency to rotation, the casing wall 10 is provided with two pairs of fingers 74 secured thereto and projecting inwardly, each pair of fingers 74 being mounted in line with one of the resilient members 60 and on opposite sides of the opposed ends 62 of those members, the resilient members 60 themselves being provided with recesses 76 into which the fingers 74 are adapted to seat. As here specifically disclosed each pair of fingers 74 projects toward one another and angularly inwardly with respect to the casing wall 10, being secured to the wall 10 by means of attaching portions 78 welded or soldered to the inside of the wall 10. This construction is preferred when a sealed casing is employed, but if sealing is not a factor, then the fingers 74 could be punched inwardly from the body of the wall 10 if desired. The recesses 76 in the resilient members 60 are oriented correspondingly with the orientation of the fingers 74, and the outer surface of the resilient members 60 are cut away as at 80 so as to provide clearance for the finger attaching portions 78. Because of the engagement between the fingers 74, which are rigidly secured to the casing wall 10, and the resilient members 60 it will be apparent that axial rotation of the resilient members 60 is positively prevented in a resilient manner.

In order that the instrument 24 should be resiliently restrained against axial rotation within the resilient members 60, a U-shaped bracket 82 is secured to the instrument 24 by means of screws 84, the outwardly projecting arms 86 of the bracket 82 being snugly received between the opposed ends 62 of both of the resilient members 60, the rotative alignment of those resilient members 60 within the casing 2 so that their respective opposed ends 62 are coplanar being effected through the interengagement of the fingers 74 and the recesses 76. Any tendency of the instruments 24 to rotate axially with respect to the resilient member 60 will cause one or the other of the outwardly projecting arms 86 of the bracket 82 to press against the appropriate ends 62 of the resilient members 60, the rotative tendency of the instrument 24 thus being resiliently absorbed. It will be realized that the surfaces 62 need not extend the entire thickness of the members 60, and that the portion of the members 60 not in line with the surfaces 62 could extend all the way around the interior of the casing portion 22, and that other means for interengaging the members 60 and the instrument 24 could be employed, provided corresponding changes be made in the configuration of the bracket 82. The illustrated embodiment, however, is advantageous because of its ease of manufacture and assembly.

If desired, the fingers 74 can extend slightly below the lower resilient member 60 and slightly above the upper resilient member 60, the retaining rings 58 and 70 having appropriately oriented recesses 88 into which the projecting portions of the fingers 74 are received. This interengagement is particularly desirable when the internal opening of either of the retaining ring 58 or 70 is non-circular so as to conform to and provide clearance for certain parts of the instrument 24.

With the instrument 24 mounted as described between the resilient members 60, any shock which might tend to force the instrument 24 upwardly or downwardly within the casing 2 would cause that portion of the appropriate resilient member 60 defined by the surface 66 to become compressed axially of the casing 2. In such an event the curvature and inclination of the surface 66 will cause that surface to bell or bulge inwardly, as indicated by the broken line 90 in Fig. 1, thus interposing a substantial layer of resilient material between the instrument 24 and the retaining ring 58 or 70, as the case may be. In the event that some force urges the instrument 24 to one side or the other within the casing 2, a similar effect will take place in that portion of the resilient member 60 defined by the surface 64, as indicated by the broken line 92 in Fig. 1, a substantial layer of resilient material thus being interposed between the instrument 24 and the side wall 10 of the casing 2.

It has already been mentioned that the relatively movable portion 32 of the instrument 24 is provided with an outwardly projecting finger 40. This finger is adapted to be engaged by the U-shaped bracket 82. In the form here disclosed, the bracket 82 is provided with an aperture 94 into which the finger 40 is received. Thus the same element which prevents the instrument 24 from rotating with respect to the resilient members 60 is utilized to fix the position of the relatively movable instrument part 32 with respect to the instrument 24.

In order to support the scale plate 54, which is secured at one end to the instrument 24 by means of screws 96 and which extends between the instrument proper and the pointer 30, the other and free end of the scale plate 54 is provided with an aperture 98 through which the upwardly projecting tip 100 of a resilient button is received, the head 102 of that button resting on the retaining ring 70.

The casing 2, with the instrument 24 mounted therein, is adapted to be secured to a panel board 104 so as to extend through an aperture 106 therein, the aperture 106 being somewhat larger than the maximum external periphery of the casing 2, mounting screws 108 being employed to secure the casing 2 in position on the panel 104. In order that the casing 2 should be, at least to some extent, insulated from vibration or impact applied to the panel 104, the rim 16 of the casing 2 is adapted to be embraced and substantially surrounded by a shock absorbing ring 110 of rubber or the like, that ring including a top wall 112 having a cutout portion 114 through which the scale plate 54 is rendered visible, a side wall 116 and an inwardly projecting lower flange 118, spaced opposed projections 120 extending upwardly from the flange 118 and downwardly from the outer section of the top wall 112. The ring 110 is also provided with parts 122 extending inwardly from the edge wall 16 and adapted to fit snugly within the peripheral notches 20 in the casing rim 16, the shock-absorbing ring 110 being formed with registering external notches 124. The shock-absorbing ring 110 is mounted on the casing 2 so that its top wall 112 extends over and protects a major portion of the crystal 56 of the casing 2, the peripheral portion of the ring 110 embracing the edge and the upper and lower surfaces of the casing rim 16, that rim being resiliently grasped between the projections 120. The rotative position of the ring 110 with respect to the casing 2 is fixed by interengagement between the internal protrusions 122 on the ring 110 and the peripheral notches 20 in the casing rim 16.

A mounting ring 125 of metal or the like has a top annular wall 126 and a depending flange 128, and is provided with holes 130 aligned with the peripheral casing rim notches 20 and the peripheral shock-absorbing ring notches 124, the mounting screws 108 being adapted to pass through the holes 130 and engage with the panel 104 in any conventional manner when the mounting ring 125 is placed in position with its flange 128 surrounding the edge of the shock-absorbing ring 110 and with its top wall 126 on top of and in contact with a portion of the upper surface of the shock-absorbing ring 110. In order to assist in proper rotative orientation of the mounting ring 125, the screw holes 130 are flanked by depending fingers 132 adapted to fit inside the peripheral notches 124 in the shock-absorbing ring 110.

As will be seen from Fig. 1, the thus described construction provides for a layer of resilient material (the lower wall 118 of the shock-absorbing ring 110) between the casing rim 16 and the panel 104, and for layers of resilient material (the side walls of the peripheral notches 124 of the shock-absorbing ring 110) between the casing rim 116 and the mounting screws 108. Hence the shock-absorbing ring 110 serves to insulate the casing 2 from vibration of the panel 104 and, to a limited extent, from shock or impact imparted to the panel 104. The vibration-resistance mounting of the casing 2 is rendered more effective by reason of the fact that the casing rim 116 is not engaged directly by the upper and lower walls of the shock-absorbing ring 110, but is instead engaged between the spaced projections 120 which, by reason of their construction, have some degree of flexibility in a rotative direction about the axis of the casing 2 and, by reason of their separated nature, have a greater degree of resiliency in a direction parallel to the casing rim 60 than would be the case had the walls proper of the shock-absorbing ring 110 directly engaged said rim 60.

By the construction above described, the instrument 24 is mounted on the panel 104 in such a manner as to be effectively insulated from vibration, shock or impact in all directions, including a rotative direction about the axis of the casing 2. The specific construction of the resilient members 60 which directly engage the instrument 24 contributes greatly to the protection afforded the instrument 24 against shock or impact parallel to or perpendicular to the axis of the casing 2. In addition, the instrument 24 is so mounted as to be resiliently protected against torsional shock or impact, and the same structure which produces this desirable effect is also employed to hold in an adjusted position a portion of the instrument 24 which might otherwise be movable with respect thereto. The entire assembly is mounted on a panel 104 in such a manner as to be insulated therefrom in all directions by a layer of resilient and shock absorbing material. Instruments mounted in accordance with the present invention are therefore extremely well protected against shock, impact or vibration, and the present mounting is achieved in a simple and easily assembled manner, using parts which may readily be fabricated on a mass production basis.

While but one embodiment of the present invention has been here disclosed, it will be apparent that many variations may be made in the details thereof without departing from the spirit of the invention as defined in the following claims.

I claim:

1. A shock proof instrument mounting for an instrument adapted to be mounted in a casing, said mounting comprising a casing, a pair of resilient members each extending around a major portion of the inner periphery of said casing, said instrument being mounted between said members and in engagement with inner instrument-supporting surfaces on said members, said members thus being separated from one another by said instrument, elements operatively connected to said casing, supporting said resilient members and forcing said members toward one another and resiliently into engagement with said instrument, and an additional element operatively connected to said casing and extending inwardly from the inner periphery thereof, one of said members having a correspondingly oriented recess in which said additional element is received, thus resiliently fixing the rotative position of said member with respect to said casing, said instrument being free of contact with any part of said mounting except said resilient members.

2. The shock proof instrument mounting of claim 1, in which said inner instrument-supporting surfaces of each of said resilient members comprise a pair of curved surfaces extending inwardly in a substantially progressive manner from one side of said member to the other and meeting along a line intermediate between the sides of said member so as to define a ledge on which the instrument is adapted to seat, movement of said instrument in any direction with respect to said members causing the curved surfaces in the direction in which said instrument moves to bell out and interpose itself between said instrument and said casing.

3. The shock proof instrument mounting of claim 1, in which one of said members extends less than completely around the inner periphery of said casing and terminates in opposed ends, and a rigid piece secured to said instrument and snugly fitting between said ends, thus resiliently fixing the rotative position of said instrument with respect to said member.

4. The shock proof instrument mounting of claim 3, in which said instrument includes a portion movable with respect to the remainder thereof, said portion including a finger extending therefrom and lockably engageable with said rigid piece, thus fixing the position of said portion relative to said instrument.

5. The shock proof instrument mounting of claim 3, in which said inner instrument-supporting surfaces of each of said resilient members comprise a pair of curved surfaces extending inwardly in a substantially progressive manner from one side of said member to the other and meeting along a line intermediate between the sides of said member so as to define a ledge on which the instrument is adapted to seat, movement of said instrument in any direction with respect to said members causing the curved surfaces in the direction in which said instrument moves to bell out and interpose itself between said instrument and said casing.

6. The shock proof instrument mounting of claim 3, in which said inner instrument-supporting surfaces of each of said resilient members comprise a pair of curved surfaces extending inwardly in a substantially progressive manner from one side of said member to the other and meeting along a line intermediate between the sides of said member so as to define a ledge on which the instrument is adapted to seat, movement of said instrument in any direction with respect to said members causing the curved surfaces in the direction in which said instrument moves to bell out and interpose itself between said instrument and said casing, and in which said instrument includes a portion movable with respect to the remainder thereof, said portion including a finger extending therefrom and lockably engageable with said rigid piece, thus fixing the position of said portion relative to said instrument.

7. A shock proof instrument mounting for an instrument adapted to be mounted in a casing having an instrument receiving portion of increased inner dimensions when compared with an adjacent portion of said casing, said mounting comprising a resilient member at the bottom of said instrument-receiving casing portion and extending around a major portion of the inner periphery of said casing portion, said resilient member having a stepped inner surface defined by curved surfaces meeting in a line intermediate between the sides thereof so as to define a ledge which opens upwardly, an instrument seated on said ledge out of engagement with said casing, a second resilient member similar to the first resilient member but oriented so that its ledge opens downwardly, said second resilient member being seated over said instrument with said instrument engaging said ledge, the outer surfaces of said resilient members being in contact with the inner surface of said casing, and means active from opposite sides of said resilient members to compress aid resilient member and thus hold said instrument in a shock proof manner with respect to said casing.

8. The shock proof instrument mounting of claim 7, in which said casing is provided with an inwardly extending finger, the resilient member adjacent thereto having a correspondingly oriented recess in which said finger seats, thus fixing the rotative position of said resilient member with respect to said casing.

9. The shock proof instrument mounting of claim 7, in which said resilient members extend less than entirely around said casing portion but terminate in opposed ends, and a rigid piece secured to said instrument and snugly fitting between said ends, thus resiliently fixing the rotative position of said instrument with respect to said members.

10. The shock proof instrument mounting of claim 9, in which said instrument includes a portion movable with respect to the remainder thereof, said portion including a finger extending therefrom and lockably engageable with said rigid piece, thus fixing the position of said portion relative to said instrument.

11. The shock proof instrument mounting of claim 9, in which said casing is provided with an inwardly extending finger, the resilient member adjacent thereto having a correspondingly oriented recess in which said finger seats, thus fixing the rotative position of said resilient member with respect to said casing.

12. The shock proof instrument mounting of claim 9, in which said casing is provided with an inwardly extending finger, the resilient member adjacent thereto having a correspondingly oriented recess in which said finger seats, thus fixing the rotative position of said resilient member with respect to said casing, and in which said instrument includes a portion movable with respect to the remainder thereof, said portion including a finger extending therefrom and lockably engageable with said rigid piece, thus fixing the position of said portion relative to said instrument.

References Cited in the file of this patent

UNITED STATES PATENTS

| | | |
|---|---|---|
| 2,188,807 | Castricone | Jan. 30, 1940 |
| 2,346,495 | Lingel | Apr. 11, 1944 |
| 2,352,049 | Weaver | June 20, 1944 |
| 2,422,908 | Kahn | June 24, 1947 |
| 2,433,509 | Drescher | Dec. 30, 1947 |
| 2,481,505 | Frazier | Sept. 13, 1949 |
| 2,505,163 | Wanner | Apr. 25, 1950 |
| 2,585,255 | Kochner et al. | Feb. 12, 1952 |
| 2,609,691 | Kirwan | Sept. 9, 1952 |